United States Patent
Nayak et al.

(10) Patent No.: US 12,513,610 B2
(45) Date of Patent: Dec. 30, 2025

(54) BARRING FACTORS IN WIRELESS COMMUNICATIONS SYSTEMS

(71) Applicant: GOOGLE LLC, Mountain View, CA (US)

(72) Inventors: Shivank Nayak, Milpitas, CA (US); Siddharth Ray, Sunnyvale, CA (US); Qin Zhang, Mountain View, CA (US); Blake Kragten, San Diego, CA (US); Jibing Wang, San Jose, CA (US); Madhusudan Kinthada Venkata, San Diego, CA (US); Srinivas Vangaru, Dublin, CA (US)

(73) Assignee: GOOGLE LLC, Mountain View, CA (US)

( * ) Notice: Subject to any disclaimer, the term of this patent is extended or adjusted under 35 U.S.C. 154(b) by 450 days.

(21) Appl. No.: 17/928,099

(22) PCT Filed: May 28, 2020

(86) PCT No.: PCT/US2020/034872
§ 371 (c)(1),
(2) Date: Nov. 28, 2022

(87) PCT Pub. No.: WO2021/242243
PCT Pub. Date: Dec. 2, 2021

(65) Prior Publication Data
US 2023/0284126 A1    Sep. 7, 2023

(51) Int. Cl.
*H04W 48/18*    (2009.01)
*H04W 48/02*    (2009.01)

(52) U.S. Cl.
CPC .......... *H04W 48/18* (2013.01); *H04W 48/02* (2013.01)

(58) Field of Classification Search
CPC .................. H04W 48/18; H04W 48/02
(Continued)

(56) References Cited

U.S. PATENT DOCUMENTS

| 2018/0227219 | A1 | 8/2018 | Zhang et al. |
| 2018/0288681 | A1* | 10/2018 | Paredes Cabrera ... H04W 48/06 |
| 2019/0261261 | A1* | 8/2019 | Ishii ...................... H04W 48/18 |

FOREIGN PATENT DOCUMENTS

| WO | 2019032798 A1 | 2/2019 |
| WO | 2019088364 A1 | 5/2019 |

(Continued)

OTHER PUBLICATIONS

International Preliminary Report on Patentability mailed Dec. 8, 2022 for PCT Application No. PCT/US2020/034872, 9 pages.

(Continued)

*Primary Examiner* — Huy C Ho

(57) ABSTRACT

Access class barring can provide latency for accessing a barred service using a radio access technology (RAT) due to congestion of a local cell accessed via that RAT. A user equipment (UE) supports multiple RATs and the same service may be accessible via a separate cell accessed using a different RAT. Various aspects of the present disclosure describe techniques for configuring the UE to selectively switch between RATs to access a service based on a barring factor employed for a particular RAT, thereby reducing latency for accessing the service. The UEs may operate to monitor a current value of a barring factor for a service the UE seeks to access via a preferred, or default, RAT. In the event that the current value of the barring factor exceeds a specified threshold, the UE switches over to using a different RAT to access this service.

20 Claims, 4 Drawing Sheets

(58) Field of Classification Search
USPC .......................................................... 370/329
See application file for complete search history.

(56) References Cited

FOREIGN PATENT DOCUMENTS

| | | | |
|---|---|---|---|
| WO | 2019194605 | A1 | 10/2019 |
| WO | 2019194717 | A1 | 10/2019 |

OTHER PUBLICATIONS

International Search Report and Written Opinion mailed Feb. 8, 2021 for corresponding International Application No. PCT/US2020/034872, 14 pages.
Communication Pursuant to Article 94(3) EPC mailed Apr. 22, 2025 for EP Application No. 20744207.0, 5 pages.

* cited by examiner

BARRING FACTORS IN WIRELESS COMMUNICATIONS SYSTEMS

CROSS-REFERENCE TO RELATED APPLICATIONS

The present application is a U.S. National Stage application under 35 U.S.C. § 371 of International Patent Application Serial No. PCT/US2020/034872, entitled "BARRING FACTORS IN WIRELESS COMMUNICATIONS SYSTEMS" and filed on May 28, 2020, the entirety of which is incorporated by reference herein.

BACKGROUND

To mitigate the consequences of a relatively large number of user equipment (UE) attempting to access the same cell or service concurrently, many wireless communications systems employ access control techniques that limit the number of UEs attempting access to a cell or service. One such technique is Access Class Barring, in which an operator of a service generates a "barring factor" (typically a value within a scale of 0 to 0.95) that is representative of the current utilization of the service. A UE in a non-privileged class receiving the barring factor then generates a pseudorandom number on the same scale as the barring factor scale and compares the generated pseudorandom number with the current value of the barring factor. If the pseudorandom number exceeds the barring factor value, the UE is permitted to continue to attempt to utilize the corresponding service. Otherwise, if the pseudorandom number is below the barring factor value, the UE is "barred" from accessing the corresponding service for a proscribed time, after which the UE can again attempt to access the service using this same process. Though Access Class Barring often is effective at preventing the overtaxing of network resources used to support the service from the operator's perspective, such processes can impede a user's employment of a UE to access such services.

SUMMARY OF EMBODIMENTS

In accordance with one aspect, a method for wireless communications at a user equipment (UE) includes selectively switching from use of a first radio access technology (RAT) to access a service at the UE to use of a second RAT for use in accessing the service at the UE responsive to a relationship between a barring factor associated with the service for the first RAT and a first barring factor threshold.

The method may also include receiving a system information message including an indication of the barring factor associated with the service and determining the barring factor based on the indication received in the system information message.

The method may further include determining the first barring factor threshold based on at least one of: a service type of the service; a power level of the UE; time resource expected to be utilized by the UE in accessing the service; a frequency resource expected to be utilized by the UE in accessing the service, and a power resource expected to be utilized by the UE in accessing the service.

In some implementations, the first RAT is fourth generation (4G) and the second RAT is fifth generation (5G) new radio (NR). In some implementations, selectively switching includes switching from use of the first RAT to use of the second RAT responsive to the barring factor exceeding the first barring factor threshold.

The method may also include subsequently switching from use of the second RAT back to use of the first RAT to access the service at the UE responsive to the barring factor satisfying a second barring factor threshold. In some implementations, the first barring factor threshold is greater than the second barring factor threshold.

In accordance with another aspect, a method for wireless communications at a UE includes determining a value of a barring factor associated with a service, determining a barring factor threshold value associated with the service based on a barring factor parameter, and switching from a first RAT to a second RAT responsive to the value of the barring factor satisfying the barring factor threshold value.

The method may also include receiving a system information message comprising an indication of the value of the barring factor and determining the value of the barring factor based on the indicated in the received system information message.

In some implementations, wherein determining the barring factor threshold value associated with the service includes determining the barring factor threshold value based on at least one of: a service type of the service; a power level of the UE; time resource expected to be utilized by the UE in accessing the service; a frequency resource expected to be utilized by the UE in accessing the service, and a power resource expected to be utilized by the UE in accessing the service.

The method may further include determining a usage level of the service based on a usage model of the service for the UE and determining the barring factor threshold value based on the determined usage level of the service.

The method may also include transmitting to a network device an indication of switching from the first RAT to the second RAT.

In some implementations, the service may include a voice over Long-Term Evolution (LTE) service or an LTE video service, or both.

In accordance with yet another aspect, a UE for wireless communication may include a radio frequency (RF) interface configured to support at least a first RAT and a second RAT. The UE may include a processor coupled to the RF interface and memory coupled with the processor. The UE may include a set of executable instructions stored in the memory and executable by the processor to manipulate the UE to selectively switch from use of the first RAT to access a service at the UE to use of the second RAT for use in accessing the service at the UE responsive to a relationship between a barring factor associated with the service for the first RAT and a first barring factor threshold.

In some implementations, selectively switching includes switching from use of the first RAT to use of the second RAT responsive to the barring factor exceeding the first barring factor threshold.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
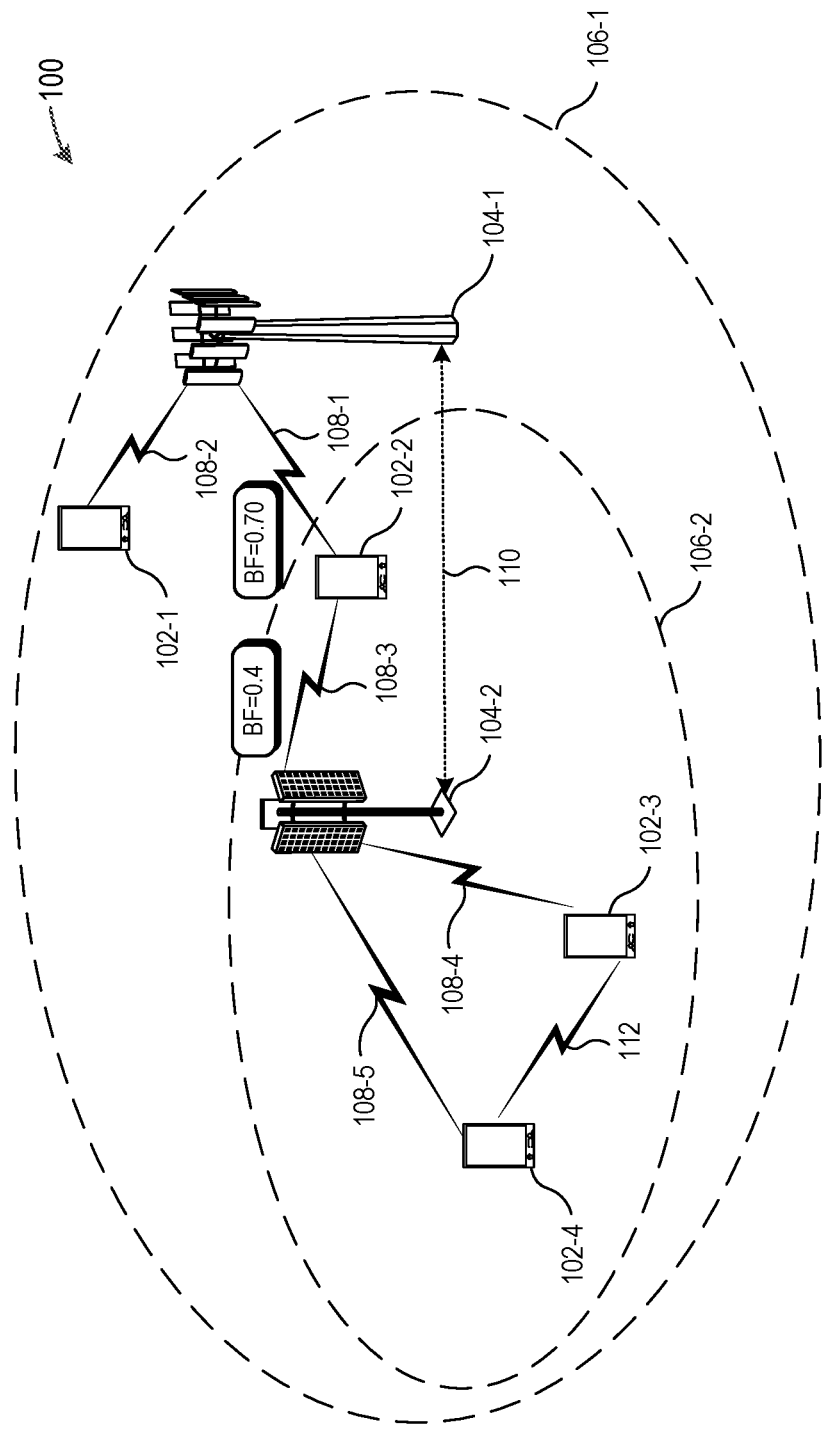
FIG. 1 illustrates a wireless communications system employing barring-factor-based RAT switching in accordance with some embodiments.

Access class barring techniques employed by network operators often can frustrate a user's ability to access a barred service using a particular radio access technology (RAT) due to congestion of the local cell accessed via that RAT. However, as many UEs often support multiple RATs, this same sought-after service often is accessible via a separate cell accessed using a different RAT. Accordingly, various aspects of the present disclosure describe systems and techniques for configuring a UE to selectively switch between RATs to access a service based on a current barring factor advertised by a cell associated with a particular RAT, and thereby reducing latency in accessing the service via a corresponding network. In at least one embodiment, the UE operates to monitor the current value of a barring factor for a service the UE seeks to access via a preferred, or default, RAT (or via a default radio access network (RAN) associated with a RAT of the UE). In the event that the current value of the barring factor exceeds a specified first threshold, the UE then switches over to using a different RAT to access this service. The UE continues to monitor the barring factor provided for the preferred RAT and if the current value of the barring factor falls below a specified second threshold (which may be the same as, or less than, the first threshold), the UE switches back to use of the preferred RAT to access the service.

To illustrate, in many situations a RAT compliant with a Fourth Generation (4G) Long Term Evolution (LTE) standard (referred to herein as a "4G LTE RAT") consumes less power accessing a particular service than a RAT compliant with a Fifth Generation (5G) New Radio (NR) standard (referred to herein as a "5G RAT") so long as the bandwidth supported by the 4G LTE RAT is sufficient for the service. As such, while the barring factor for the service accessed via the 4G LTE RAT does not exceed the specified threshold, the UE attempts to maintain the use of the service via a 4G LTE RAT, and thus uses the lower-power option while the barring factor is relatively low. However, if the current value of the barring factor exceeds a specified threshold, then the UE switches to using a 5G NR RAT to access the service (assuming the service is not similarly barred when a 5G NR RAT is used). This results in higher power consumption but is more likely to provide earlier access to the requested service and thus provide sufficient quality of experience for the user. However, should the current value of the barring factor for the 4G LTE RAT fall below a lower threshold, then the UE then switches back to using the 4G LTE RAT to access the service and thus returns to the (typically) lower-power option for providing the service to the user without substantially impacting the user's experience.

For ease of illustration, the following systems and techniques are described in an example context in which the multiple RATs supported by a UE include at least one RAT that is compliant with a 5G NR standard (e.g., Third Generation Partnership Project (3GPP) Release 15, 3GPP Release 16, etc.) and another RAT that is compliant with a 4G standard, and more specifically, a 4G LTE standard (e.g., 3GPP Release 8, 3GPP Release 9, etc.). However, it should be understood that the present disclosure is not limited to a 4G RAT/5G RAT configuration, but rather the techniques described herein can be applied to any combination of different RATs employed at the same UE and for which the UE exhibits a general or specific preference for accessing a service using one RAT over another RAT for any of a variety of reasons. Accordingly, reference herein to a 4G LTE RAT and a 5G RAT applies equally to any combination of different RATs implemented at a UE.

FIG. 1 illustrates a wireless communications system 100 employing barring-factor-based selective RAT switching in accordance with some embodiments. The wireless communications system includes one or more UEs 102 (such as the illustrated UEs 102-1, 102-2, 102-3, and 102-4) and one or more base stations 104 (such as the illustrated base stations 104-1 and 104-2). The UEs 102 and the base stations 104 typically are dispersed throughout one or more geographic areas to form the wireless communications system 100, with each base station 102 representing an "edge" of a corresponding radio access network (RAN). Each base station 104 provides a coverage area 106 over which the UEs 102 and the base station 104 can establish one or more communication links 108. The coverage area 106 can be an example of a geographic area over which a UE 102 and a base station 104 support communication of signals according to one or more RATs, for example, 4G LTE and 5G NR RATs.

In addition to wireless communication with the UEs 102, the base stations 104 typically communicate with a core network (not shown), or with one another, or both. For example, the base stations 104 can interface with a core network through one or more backhaul links (e.g., via an S1, N2, N3, or another interface). The base station 104-1 and the base station 104-2 communicate with one another over the backhaul links 110 (e.g., via an X2, Xn, or other interfaces) either directly (e.g., directly between the base stations 104), or indirectly (e.g., via a core network), or both. The base stations 104, depending on the corresponding technology deployed, also are commonly referred to as base transceiver stations, radio base stations, access points, radio transceivers, NodeBs, an eNodeB (eNB) (particularly for 4G LTE), giga-NodeBs (gNB) (particularly for 5G, a Home NodeB, a Home eNodeB, and the like.

A UE 102, also commonly referred to as a mobile device, a wireless device, a remote device, a handheld device, or a subscriber device, and the like can include any of a variety of devices suitable for wireless communications with the base stations, such as a cellular phone, a cellular-enabled tablet computer or cellular-enabled notebook computer, an automobile or other vehicle employing cellular services (e.g., for navigation, provision of entertainment services, in-vehicle mobile hotspots, etc.), and the like.

Each base station 104 provides communication coverage and services via one or more cells, for example, a macro cell, a small cell, a hot spot, or other types of cells, or any combination thereof. The term "cell" generally refers to a logical communication entity used for communication with a base station 104 (e.g., over a carrier) and can be associated with an identifier for distinguishing neighboring cells (e.g., a physical cell identifier (PCID), a virtual cell identifier (VOID), or others). In some embodiments, a cell can also refer to the geographic coverage area 106 or a portion of the geographic coverage area 106 (e.g., a sector) over which the logical communication entity operates.

It will be appreciated that, under certain circumstances, a cell of the wireless communications system 100 might risk excessive congestion due to the number of UEs 102 attempting to access the cell or a particular service supported by a cell (or by the network at large) is at risk of overutilization.

To mitigate this risk, the wireless communications system 100 employs an access class barring scheme that operates to limit the number of simultaneous access attempts from certain UEs 102 so as to attempt to redistribute the access requests of UEs 102 over time. The access class barring scheme typically is implemented through each base station 104 transmitting a dynamically-updated barring factor for a given access service supported by the access class barring scheme, where the transmitted barring factor has a variable value that is dynamically set based on load conditions at a corresponding cell or for the associated access service. For example, the value of the barring factor can vary between 0 to 0.95 in increments of 0.05 depending on the current loading of the associated cell or access service. A conventional UE that is attempting to access a service or cell associated with a transmitting barring factor typically is configured to generate a pseudo-random number within a corresponding range and then is only permitted to access the cell or service at that time if the generated pseudorandom number is greater than the current barring factor value. As such, the barring factor associated with a cell can prevent timely access to the network for a conventional UE.

In the example of FIG. 1, the base station 104-1 is a cell providing communication coverage and services using a particular, or default RAT. For example, the base station 104-1 can be associated with a 4G network (e.g., 4G LTE). The base station 104-2 can be another cell providing communication coverage and services using a different RAT. For example, the base station 104-2 can be associated with a 5G network (e.g., 5G NR). The UE 102-2 selects a cell to camp on, for example, a cell associated with the base station 104-1 based on a cell selection procedure. As part of the cell selection procedure, the UE 102-2 performs cell searching in which the UE 102-2 achieves time and frequency synchronization with a cell and learns other information about the cell.

The UE 102-2 performs a cell search on one or multiple frequencies using synchronization signals before selecting or re-selecting a cell. The UE 102-2 monitors the synchronization signals to acquire time synchronization and to identify a cell identifier. The UE 102-2 then monitors the synchronization signals to further acquire time synchronization. In some embodiments, the UE 102-2 monitors downlink reference signals to determine a signal quality in the cell. The UE 102-2 reads information on a broadcast channel (BCH) and decodes a master information block (MIB) or one or more system information blocks (SIBs) to acquire details about the cell. For example, a first SIB (SIB1) can contain cell access parameters and scheduling information for other SIBs. Decoding SIB1 enables the UE 102-2 to receive a second SIB (SIB2). SIB2 can contain radio resource control (RRC) configuration information related to cell barring.

In the example of FIG. 1, a UE 102-2 supports efficient techniques for reducing a delay associated with accessing a service that is barred at a cell by selecting a different cell that supports and provides access to the service. For example, a service can be barred for a cell associated with the base station 104-1 but might not be barred for a cell associated with the base station 104-2. As described herein, to reduce the delay associated with accessing the service (e.g., a voice call, a video call), the UE 102-2 provides a fallback procedure that allows the UE 102-2 to fall back to a 5G NR network to access the service. Specifically, the UE 102-2 determines whether the service can be accessed through a 5G network via the base station 104-2, and, if the UE 102-2 determines that the service can be accessed through the 5G network, the UE 102-2 connects to the 5G network to access the service.

By way of example, the UE 102-2 transmits, to a base station 104-1, a request message to access a service via the base station 104-1 using a default RAT associated with the base station 104-1. For example, the UE 102-2 transmits a request message to access a service via the base station 104-1 using 4G LTE via the communication link 108-1. In response to the request message, the base station 104-1 transmits a response message (e.g., a system information message) that includes an indication of a barring factor associated with the service. The system information message can be a SIB (e.g., a SIB1, a SIB2). The barring factor can have a value between 0 to 0.95 and be representative of current utilization of the requested service. For example, the barring factor for the service might be 0.70. As a result, the UE 102-2 will be delayed or barred in accessing the service due to high utilization of the requested service at the base station 104-1.

To eliminate or decrease the delay in accessing the service, the UE 102-2 determines whether to switch from using the default RAT (e.g., a 4G LTE RAT) to using a different RAT (e.g., a 5G NR RAT) associated with the base station 104-2. In some embodiments, the UE 102-2 determines whether to switch from using the default RAT to using a different RAT based on the barring factor satisfying a barring factor threshold. The UE 102-2 determines a barring factor threshold associated with the service based on one or more barring factor parameters. For example, the UE 102-2 determines a barring factor threshold based on a service type of the service. In some embodiments, different services may be associated with different barring factor thresholds. In some other embodiments, the UE 102-2 determines a barring factor threshold based on a power level of the UE 102-2 or a power resource expected to be utilized by the UE 102-2 in accessing the service, or both. Additionally or alternatively, the UE 102-2 determines a barring factor threshold based on a usage level of the service by the UE 102-2.

The UE 102-2 performs a cell selection or cell reselection procedure to determine whether another cell, such as a neighboring cell associated with the base station 104-2 can provide access to the service. In the example of FIG. 1, because the reported barring factor (e.g., BF=0.70) by the base station 104-1 via communication link 108-1 for the service is greater than a barring factor threshold, the UE 102-2 switches to using a different RAT associated with the base station 104-2. For example, the UE 102-2 performs a cell selection or cell reselection procedure to identify and select the base station 104-2 for accessing the service. As part of the cell selection or cell reselection procedure, the UE 102-2 determines whether the cell associated with the base station 104-2 meets one or more cell selection criteria. A cell selection criterion can include a measured cell reference signal received power (RSRP) value of the cell associated with the base station 104-2, or a reference signal received quality (RSRQ) value, etc. In some embodiments, the base station 104-2 reports a barring factor (e.g., BF=0.40) for the service via communication link 104-2, and the UE 102-2 determines that reported barring factor is less than the barring factor threshold. As a result, the UE 102-2 connects to the base station 104-2 and accesses the service using a different RAT (e.g., 5G NR).

In some embodiments, while accessing the service using the different RAT (e.g., 5G NR) associated with the base station 104-2, the UE 102-2 receives another message (e.g., a subsequent system information message) from the base station 104-1, which includes an updated barring factor for the service. For example, the barring factor for the service at the base station 104-1 may have changed from 0.70 to 0.20. In this case, the UE 102-2 determines that the barring factor is less than the barring factor threshold for the service. As a result, the UE 102-2 switches from using the different RAT associated with the base station 104-2 to using the default RAT associated with the base station 104-1 according to a cell selection and reselection procedure. Similarly, the UE 102-2 performs a cell selection or cell reselection procedure for switching back to the base station 104-1 for accessing the service. The UE 102-2 therefore, reduces the latency associated with accessing a service that is barred by the base station 104-1 associated with a default RAT by switching to using a different RAT associated with the base station 104-2 as described herein.

Accordingly, a UE 102 monitors an LTE access class barring factor to enable or disable a 5G connection when a user initiates access to common services, such as CS voice, VoLTE voice, LTE video, mobile originated signaling, packet services, etc. The UE 102 connects to a 5G network, when the LTE barring factor is high and data throughput does not exceed a threshold. The UE 102 also disconnects from the 5G network when the LTE access barring factor falls below a threshold (i.e. is low) and there is no other requirement to keep 5G enabled.

Figure 2:
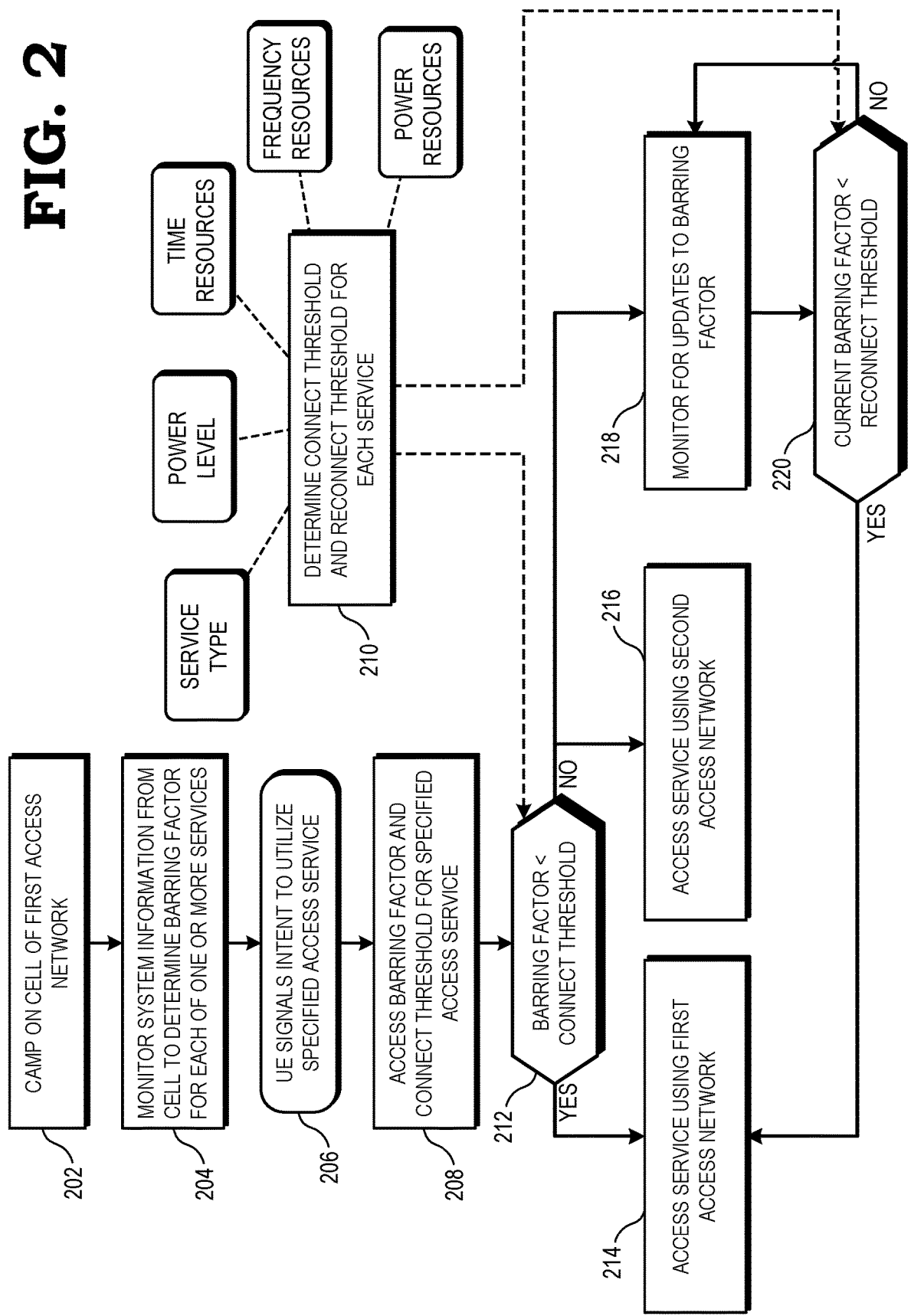
FIG. 2 illustrates an example method for selective RAT switching based on barring factor in accordance with some embodiments.

FIG. 2 illustrates an example method 200 for selectively switching between RATs at a UE for accessing a service based on current barring factor value(s) in accordance with some embodiments. The method 200 is described in the example context of the wireless communications system 100 of FIG. 1. The method 200 can be based on a configuration by a UE 102 or a base station 104, and implemented by the UE 102 to decrease a delay for accessing a barred service associated with a particular RAT, due to congestion of a local cell accessed via that RAT, by accessing the same service via a separate cell accessed using a different RAT. The method 200 may also be based on a configuration by the UE 102 or the base station 104 and implemented by the UE 102 for power saving at the UE 102, among other benefits. In the following description of the method 200, the operations performed by the UE 102 can be performed in a different order than the example order shown, or the operations performed by the UE 102 can be performed in a different order or at different times. Some operations can also be omitted from the method 200, and other operations can be added to the method 200.

The method 200 commences at block 202 with a UE 102 camping on a cell of a first RAT. For example, UE 102 can be camping on a cell associated with a 4G network. The cell can provide one or more services to the UE 102, such as for a circuit-switched (CS) voice service, a voice-over LTE (VoLTE) service, an LTE video service, a packet service, and the like. As described herein, a cell can be a macro cell, a small cell, a hot spot, or other types of cells, or any combination thereof. At block 204, the UE 102 monitors for system information from the cell to determine a barring factor for each of one or more services. In some embodiments, the UE 102 obtains a barring factor from each potential cell. For example, the UE 102 can receive a barring factor from each potential cell via system information message (e.g., a SIB). The UE 102 can store each obtained barring factor from each potential cell in a data structure for later access, etc.

At block 206, the UE 102 signals (e.g., via uplink signals) an intent to utilize a specified access service. For example, the UE 102 transmits a message, such as an RRC message or some other control message to the cell including a request for the specified access service. Alternatively, in some embodiments, the UE 102 signals a potential cell the request for the specified access service according to the stored barring factors it obtained from each of the potential cells previously. For example, the UE 102 can select a potential cell that is associated with a stored barring factor that the UE 102 previously obtained and is the lowest barring factor of all the stored barring factors the UE 102 obtained that are related to the potential cells.

At 208, the UE 102 receives signals (e.g., via downlink signals) from the cell that can carry an indication of a barring factor for the specified access service, as described herein. The cell can provide an indication of a barring factor via system information message (e.g., a SIB) to the UE 102. The UE 102 can determine a probability p for accessing a specified access service based on the barring factor provided in the system information message (e.g., SIB). For example, the cell can broadcast a SIB that carries a barring factor ($0 \leq p \leq 1.0$) and one or more additional barring parameters, such as a barring duration. The UE 102 generates a random number between 0 and 1 and compares the number with p. If the random number is equal to or greater than p, the access to cell and thereby the specified access service is barred for the barring duration.

The barring factor corresponds to the determination of whether the cell is barred or not for the specified access service. At block 210, the UE 102 determines a connect threshold and a reconnect threshold for each of the one or more services including the specified access service. The UE 102 can determine the connect and reconnect thresholds, in some embodiments, based on a service type associated with each service including the specified access service. Examples of service types may include a voice call, a video call, a multimedia service, etc.

At 212, the UE 102 determines whether the barring factor reported by the cell for the specified access service is less than the connect threshold determined for the specified access service. If the UE 102 determines that the barring factor reported by the cell for the specified access service is less than the connect threshold determined for the specified access service, the UE 102 may at block 214 access the service using the first access network (e.g. 4G LTE) associated with the cell. Otherwise, the UE 102 accesses the service using a second access network (e.g., 5G NR). For example, the UE 102 performs cell selection to identify and select a neighboring cell available for accessing the service as described herein.

At 218, the UE 102 semi-periodically or periodically monitors for updates to the barring factor for the specified access service. For example, the UE 102 can ping the cell that the UE 102 queried initially for accessing the service for an update on the barring factor associated with the cell for the service. In some embodiments, the cell transmits a message to the UE 102 to indicate an update to the barring factor associated with the service. At 220, the UE 102 determines whether a current barring factor is less than the reconnect threshold. If the UE 102 determines that the current barring factor for the specified access service is less than the reconnect threshold determined for the specified access service, the UE 102 can access the service using the first access network (e.g. 4G LTE) associated with the cell. For example, the UE 102 switches back to a default cell associated with the first access network based on a cell reselection procedure. Otherwise, the UE 102 continues to access the service using the second access network (e.g., 5G NR) and monitors for updates to the barring factor for the service.

As explained above, the decision on whether to remain with the default RAT or switch to an alternative RAT at block 212 is based on a comparison of the current barring factor value to the connect threshold at block 212. Likewise, the decision on whether to revert back to the default RAT from the alternative RAT for accessing the indicated service is based on a comparison of the current, or updated, barring factor for the default RAT with the reconnect threshold. Accordingly, block 210 represents a subprocess for determining these two thresholds (which may be the same). To illustrate, in one embodiment, the connect and reconnect thresholds are determined by a user, a provider of the UE 102, a network operator, or other entity based on one or more barring factor parameters. In some embodiments, the UE 102 can determine a connect barring factor threshold or a reconnect barring factor threshold, or both, based on one or more barring factor parameters. For example, at block 210, the UE 102 determines a connect threshold and a reconnect threshold for each of the one or more services including the specified access service. The UE 102 can determine the connect and reconnect thresholds, in some embodiments, based on a service type associated with each service including the specified access service. Examples of service types may include a voice call, a video call, a multimedia service, etc.

In some other embodiments, the UE 102 determines the connect and reconnect thresholds based on a power level of the UE 102. For example, the UE 102 determines the connect and reconnect thresholds based on a battery level (e.g., battery percentage) of the UE 102. In other embodiments, the UE 102 determines the connect and reconnect thresholds based on time resources expected to be utilized by the UE 102 in accessing each service including the specified access service. The time resources include symbol periods, mini-slots, slots, subframes, frames, and the like associated with a system bandwidth that is expected to be utilized by the UE 102 in accessing each service. The UE 102 determines the connect and reconnect thresholds based on frequency resources expected to be utilized by the UE 102 for each service including the specified access service. The frequency resources include subcarriers, carriers, and the like associated with a system bandwidth that is expected to be utilized by the UE 102 in accessing each service. The time and frequency resources needed in accessing and running the service, which the UE 102 can indicate to a cell for allocation and purposes for accessing the service via the cell. Additionally or alternatively, the UE 102 determines the connect and reconnect thresholds based on a power resource expected to be utilized by the UE 102 for each service including the specified access service. The power resource includes a receive power level of the UE 102 for receiving transmissions associated with the specified service from the cell.

Figure 3:
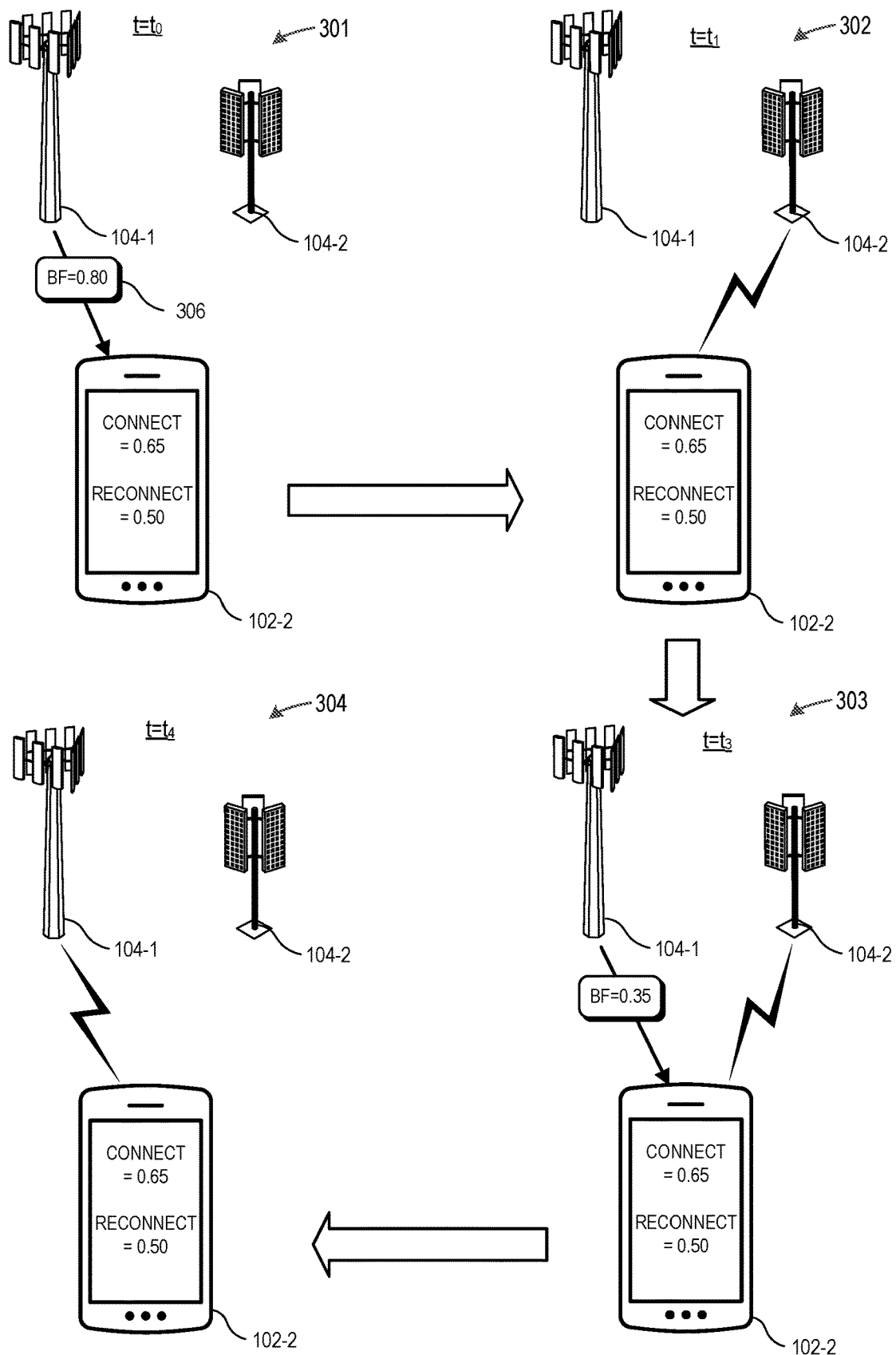
FIG. 3 illustrates an example implementation of the method of FIG. 2 in the system of FIG. 1 in accordance with some embodiments.

FIG. 3 illustrates an example implementation of the method 200 of FIG. 2 in accordance with some embodiments. In this example, the connect threshold is set to 0.65 on a 0 to 0.95 scale, the reconnect threshold is set to 0.50 on the same scale, the default RAT for the subject service is the 4G LTE RAT, and the UE 102-2 is initially camped on a cell associated with the 4G LTE base station 104-1. At time t0 (represented by view 301), the base station 104-1 transmits a system information message 306 (e.g., a SIB) that indicates that the current barring factor value for the service is 0.80. In response to a comparison revealing that this value is greater than the connect threshold, the UE 102 switches to using its 5G RAT to connect to the 5G base station 104-2 to access the service at time ti (as illustrated by view 302). Note that in this example, it is assumed that the 5G base station 104-2 is either not barring access or is providing a sufficiently low barring factor value. Subsequently, at time t3 (as illustrated by view 303), the 4G LTE base station 104-1 transmits a system information message 308 (e.g., a SIB, or an RRC message) indicating an updated current barring factor value of 0.35 for the service. In response to determining that the current barring factor value for the service is now below the reconnect threshold, at time t4 the UE 102-2 switches back to using its 4G LTE RAT to connect to the base station 104-1 to access the service.

In the example of FIG. 3, a UE 102-2 transmits, to a base station 104-1, a request message to access a service via the base station 104-1 using a default RAT associated with the base station 104-1. For example, the UE 102-2 transmits a request message to access a voice call service via the base station 104-1 using 4G LTE. Although the example described in FIG. 3 relates to a voice call (i.e., a VoLTE service), it is to be understood that same or similar techniques can be used for other operations. In response to the request message, the base station 104-1 transmits a response message (e.g., a system information message) that includes an indication of a barring factor associated with the service. The barring factor can have a value between 0 to 0.95 and be representative of current utilization of the requested service. For example, the barring factor for the voice call service is 0.80. As a result, the UE 102-2 might be delayed in accessing the voice call service due to high utilization of the requested service.

To avoid latency in accessing the service, the UE 102-2 determines whether to switch from using the default RAT (e.g., 4G LTE) to using a different RAT (e.g., 5G NR) associated with the base station 104-2. In some embodiments, the UE 102-2 determines whether to switch from using the default RAT to using a different RAT based on the barring factor satisfying a barring factor threshold. The UE 102-2 determines a barring factor threshold associated with the service based on one or more barring factor parameters. For example, the UE 102-2 determines a barring to factor threshold based on a service type of the service. In some embodiments, different services can correspond to different barring factor thresholds. For example, a voice call can have a particular barring factor threshold, while a video call can have a different barring factor threshold. In some other embodiments, the UE 102-2 determines a barring factor threshold based on a power level of the UE 102-2 or a power resource expected to be utilized by the UE 102-2 in accessing the service, or both.

The UE 102-2, additionally or alternatively, determines multiple barring factor thresholds associated with the service. For example, the UE 102-2 determines a connect barring factor threshold (e.g., BF=0.65) and a reconnect barring factor threshold (e.g., BF=0.50). In some embodiments, the UE 102-2 uses the connect barring factor threshold to determine whether to switch from using a default RAT to using a different RAT. Likewise, the UE 102-2 uses the reconnect barring factor threshold to determine whether to switch back from using the different RAT to using the default RAT. In the example of FIG. 3, because the reported barring factor (e.g., BF=0.80) by the base station 104-1 for the service is greater than the connect barring factor threshold (e.g., BF=0.65), the UE 102-2 switches to using a different RAT associated with the base station 104-2. For example, the UE 102-2 performs a cell selection or cell reselection procedure to identify and select the base station 104-2 for accessing the service.

In some embodiments, while accessing the service using the different RAT (e.g., 5G NR) associated with the base station 104-2, the UE 102-2 receives another message (e.g., a subsequent system information message 308) from the base station 104-1, which includes a new (updated) barring factor for the service. For example, the barring factor for the service at the base station 104-1 has changed from 0.80 to 0.35. In this case, the UE 102-2 determines that the barring factor is less than the reconnect barring factor threshold for the service. As a result, the UE 102-2 switches from using the different RAT associated with the base station 104-2 to using the default RAT associated with the base station 104-1. Similarly, the UE 102-2 performs a cell selection or cell reselection procedure for switching back to the base station 104-1 for accessing the service. The UE 102-2, therefore, reduces the latency associated with accessing a service that is barred by the base station 104-1 associated with a default RAT by switching to using a different RAT associated with the base station 104-2 as described herein.

Figure 4:
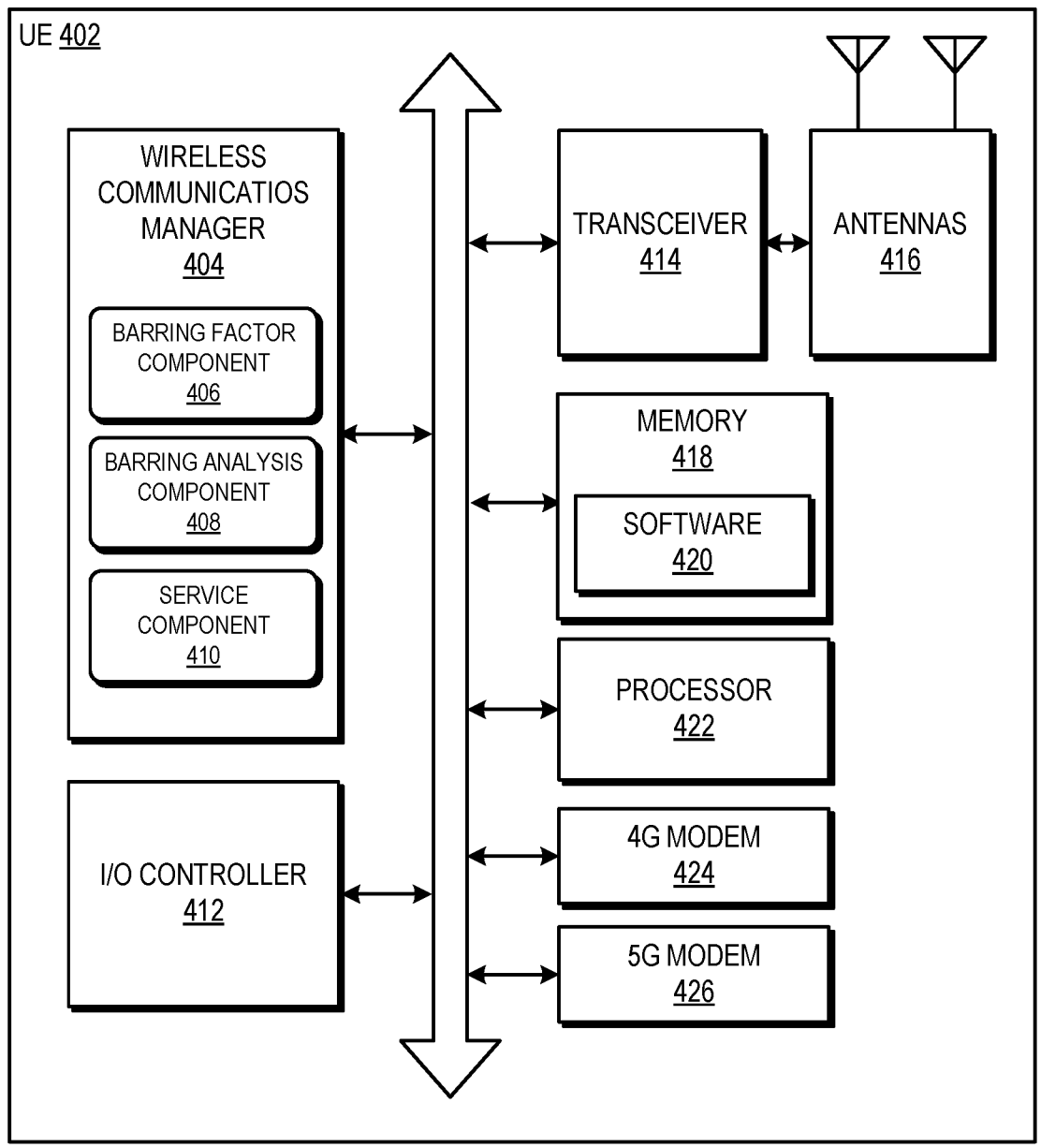
FIG. 4 illustrates a UE utilizing selective RAT switching based on barring factor in accordance with some embodiments.

FIG. 4 illustrates a UE 402 in accordance with some embodiments. The UE 402 may be an example of a UE 102 as described in FIG. 1, respectively. The UE 402 may include components for bi-directional voice and data communications including components for transmitting and receiving communications, including a wireless communications manager 404, an input/output (I/O) controller 412, a transceiver 414, antennas 416, a memory 418, a processor 422, a 4G modem 424, and a 5G modem. These components can be in electronic communication via one or more buses.

The wireless communications manager 404, or its sub-components, can be implemented in hardware, software or firmware executed by the processor 422, or any combination thereof. If implemented in software or firmware executed by the processor 422, the functions of the wireless communications manager 404, or its sub-components can be executed by a general-purpose processor, a digital signal processor (DSP), an application-specific integrated circuit (ASIC), a field-programmable gate array (FPGA) or other programmable logic device, discrete hardware components, or any combination therefore designed to perform the functions described in the present disclosure.

The wireless communications manager 404, or its sub-components, can be physically located at various positions, including being distributed such that portions of functions are implemented at different physical locations by one or more physical components. The wireless communications manager 404, or its sub-components, can be a separate and distinct component in accordance with various aspects of the present disclosure. The wireless communications manager 404, or its sub-components, can be combined with other hardware components, including the I/O controller 412, the transceiver 414, another UE (e.g., a UE 102 or a base station 104 as described in FIG. 1), one or more other components described in the present disclosure, or a combination thereof in accordance with the various aspects of the present disclosure.

The wireless communications manager 404 can include a barring factor component 406, a barring analysis component 408, and a service component 410. The barring factor component 406 can receive a system information message including an indication of a barring factor associated with a service and determine a barring factor based on the indication received in the system information message. The service can be an LTE service, a 5G service, an LTE video service, among other examples. The barring analysis component 408 can determine a barring factor threshold based on a service type of the service. In some embodiments, the barring analysis component 408 can determine a barring factor threshold based on a power level of the UE 402. In some other embodiments, the barring analysis component 408 can determine a barring factor threshold based on time resource expected to be utilized by the UE 402 in accessing the service or a frequency resource expected to be utilized by the UE 402 in accessing the service, or any combination thereof. The time resources include symbol periods, mini-slots, slots, subframes, frames, and the like associated with a system bandwidth that are expected to be utilized by the UE 402 in accessing the service, while the frequency resources include subcarriers, carriers, and the like associated with the system bandwidth that are expected to be utilized by the UE 402 in accessing each service. In other embodiments, the barring analysis component 408 can determine a usage level of the service based on a usage model of the service for the UE 402, and determine the barring factor threshold value based on the determined usage level of the service. For example, the UE 402 may track usage data in a data structure to determine a usage level of the service. The usage data may include information, such as one or more timestamps related to the UE 402 requesting access to the service. The information can also include time periods related to when the UE 402 accessed the service and duration that the service was accessed for. The information can, additionally or alternatively, include a frequency (e.g., a number of occurrences) associated with the UE 402 accessing the service.

Accordingly, the usage data may provide an indication of a behavior (e.g., an access pattern) of the UE 402 associated with accessing or requesting access to the service.

The service component 410 can selectively switch the UE 402 from using a first RAT (e.g., via the 4G modem 424 or the 5G modem 426) to access the service at the UE 402 to using a second RAT (e.g., via the 4G modem 424 or the 5G modem 426) for use in accessing the service at the UE 402 responsive to a relationship between a barring factor associated with the service for the first RAT and a first barring factor threshold. In some embodiments, the first RAT can be 4G LTE and the second RAT can be 5G NR. In some other embodiments, the first RAT can be 5G NR and the second RAT can be 4G LTE. The service component 410 can selectively switch the UE 402 from using the first RAT to using the second RAT (e.g., via the 4G modem 424 or the 5G modem 426) responsive to the barring factor exceeding the first barring factor threshold. In some embodiments, the service component 402 can subsequently switch the UE 402 from using the second RAT back to using the first RAT to access the service at the UE 402 (e.g., via the 4G modem 424 or the 5G modem 426), responsive to the barring factor satisfying a second barring factor threshold. The first barring factor threshold is greater than the second barring factor threshold. In some embodiments, the service component 410 can transmit to a network device (e.g., a base station 104 as described in FIG. 1, respectively) an indication of switching from the first RAT to the second RAT. The indication can be provided in an uplink control information (UCI) message by the UE 402.

The I/O controller 412 can manage input and output signals for the UE 402. The I/O controller 412 can also manage peripherals not integrated into the UE 402. In some embodiments, the I/O controller 412 can represent a physical connection or port to an external peripheral. In some other embodiments, the I/O controller 412 can utilize an operating system such iOS®, ANDROID®, MS-DOS®, MS-WINDOWS®, OS/2®, UNIX®, LINUX®, or another known operating system. The I/O controller 412 can represent or interact with a modem, such as the 4G modem 424 and the 5G modem 426, a keyboard, a mouse, a touchscreen, or a similar peripheral device. The I/O controller 412 can be implemented as part of the processor 422. An end-user can interact with the UE 402 via the I/O controller 412 or via hardware components controlled by the I/O controller 412.

The transceiver 414 can communicate bi-directionally, via one or more antennas 416. The transceiver 414 can function as a receiver or a transmitter. For example, a receiver and a transmitter can be collocated in the transceiver 414. When operating as a receiver, the transceiver 414 can receive information such as packets, control information or user data associated with various information channels (e.g., control channels, data channels, and information related to access related barring factors, etc.). Information can be passed on to other components of the UE 402. When operating as a transmitter, the transceiver 413 can transmit signals generated by other components of the UE 402. The UE 402 can include a single antenna 416 or to more than one antenna 416, which can be capable of simultaneously transmitting or receiving wireless communications.

The memory 418 can include a random-access memory (RAM) or a read-only memory (ROM). The memory 418 can store computer-readable, computer-executable software 420 including instructions that, when executed, cause the processor 422 to perform various functions described herein. In some embodiments, the memory 418 can include, among other components, a BIOS which can control basic hardware or software operation, such as interaction with peripheral components or devices. The software 420 can include instructions to implement aspects of the present disclosure, including instruction to support switching RATs to reduce latency for accessing a service based on a barring factor of the service satisfying a barring factor threshold. The software 420 can be stored in a non-transitory computer-readable medium such as system memory or other type of memory. In some embodiments, the software 420 cannot be directly executable by the processor 422 but can cause a computing device (e.g., when compiled and executed) to perform functions described herein.

The processor 422 can include an intelligent hardware device (e.g., a general-purpose processor, a DSP, a central processing unit (CPU), a microcontroller, an ASIC, an FPGA, or other programmable logic device, discrete hardware components, or any combination therefore). In some embodiments, the processor 422 can be configured to operate a memory array using a memory controller. In some other embodiments, a memory controller can be integrated into the processor 422. The processor 422 can be configured to execute computer-readable instructions stored in the memory 418 to cause the UE 402 to perform various functions (e.g., functions or tasks supporting switching RATs to reduce latency for accessing a service).

The 4G modem 424 and the 5G modem 426 include radio frequency interfaces configured to support various RATs, for example, 4G LTE and 5G NR. The 4G modem 424 and the 5G modem 426 can be coupled to the processor 422 the memory 418, the transceiver 414, etc., as described herein. The 4G modem 424 and the 5G modem 426 can modulate packets and provide the modulated packets to the transceiver 414 for transmission. Similarly, the 4G modem 424 and the 5G modem 426 can receive packets from the transceiver 414 and demodulate the received packets from the antennas 416.

Various aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, RAM or other non-volatile memory device or devices, and the like. The executable instructions stored on the non-transitory computer readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., ROM or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

For example, aspects of the subject matter described herein may be implemented to realize one or more of the following improvements, among others. The communication devices (e.g., UEs, base stations) may experience improvements to the operation of the communication devices. For example, operations performed by the communication devices may reduce latency in accessing a network, and communication services provided by the network. The communication devices may also experience improvements to power consumption, and promote efficiency for accessing communication services, among other benefits.

What is claimed is:

1. A method for wireless communication at a user equipment (UE), comprising:
selectively switching from use of a first radio access technology (RAT) to access a service at the UE to use of a second RAT for use in accessing the service at the UE responsive to a relationship between a barring factor associated with the service for the first RAT and a first barring factor threshold; and
subsequently switching from use of the second RAT back to use of the first RAT to access the service at the UE responsive to the barring factor satisfying a second barring factor threshold.

2. The method of claim 1, further comprising:
receiving a system information message comprising an indication of the barring factor associated with the service; and
determining the barring factor based on the indication received in the system information message.

3. The method of claim 1, further comprising determining the first barring factor threshold based on at least one of: a service type of the service; a power level of the UE; time resource expected to be utilized by the UE in accessing the service; a frequency resource expected to be utilized by the UE in accessing the service, and a power resource expected to be utilized by the UE in accessing the service.

4. The method of claim 1, wherein the first RAT is fourth generation (4G) and the second RAT is fifth generation (5G) new radio (NR).

5. The method of claim 1, wherein selectively switching comprises switching from use of the first RAT to use of the second RAT responsive to the barring factor exceeding the first barring factor threshold.

6. The method of claim 1, wherein the first barring factor threshold is greater than the second barring factor threshold.

7. The method of claim 1, wherein the barring factor satisfies the second barring factor threshold when the barring factor is less than the second barring factor threshold.

8. A method for wireless communications at a user equipment (UE), comprising:
determining a value of a barring factor associated with a service;
determining a first barring factor threshold value associated with the service based on a barring factor parameter; and
switching from a first radio access technology (RAT) to a second RAT responsive to the value of the barring factor satisfying the first barring factor threshold value; and
subsequently switching from use of the second RAT back to use of the first RAT to access the service at the UE responsive to the barring factor satisfying a second barring factor threshold.

9. The method of claim 8, further comprising:
receiving a system information message comprising an indication of the value of the barring factor; and
determining the value of the barring factor based on the indicated in the received system information message.

10. The method of claim 8, wherein determining the first barring factor threshold value associated with the service comprises determining the first barring factor threshold value based on at least one of: a service type of the service; a power level of the UE; time resource expected to be utilized by the UE in accessing the service; a frequency resource expected to be utilized by the UE in accessing the service; and a power resource expected to be utilized by the UE in accessing the service.

11. The method of claim 8, wherein determining the first barring factor threshold value associated with the service comprises:
determining a usage level of the service based on a usage model of the service for the UE; and
determining the first barring factor threshold value based on the determined usage level of the service.

12. The method of claim 8, further comprising:
transmitting to a network device an indication of switching from the first RAT to the second RAT.

13. The method of claim 8, wherein the service comprises a voice over Long-Term Evolution (LTE) service or an LTE video service, or both.

14. A user equipment (UE) for wireless communication, comprising:
a radio frequency (RF) interface configured to support at least a first radio access technology (RAT) and a second RAT;
a processor coupled to the RF interface, memory coupled with the processor; and
a set of executable instructions stored in the memory and executable by the processor to manipulate the UE to:
selectively switch from use of the first RAT to access a service at the UE to use of the second RAT for use in accessing the service at the UE responsive to a relationship between a barring factor associated with the service for the first RAT and a first barring factor threshold; and
subsequently switch from use of the second RAT back to use of the first RAT to access the service at the UE responsive to the barring factor satisfying a second barring factor threshold.

15. The UE of claim 14, wherein selectively switching comprises switching from use of the first RAT to use of the second RAT responsive to the barring factor exceeding the first barring factor threshold.

16. The UE of claim 14, wherein the first barring factor threshold is greater than the second barring factor threshold.

17. The UE of claim 14, wherein the set of executable instructions further are executable by the processor to manipulate the UE to:
receive a system information message comprising an indication of the barring factor associated with the service; and
determine the barring factor based on the indication received in the system information message.

18. The UE of claim 14, wherein the set of executable instructions further are executable by the processor to manipulate the UE to:
determine the first barring factor threshold based on at least one of: a service type of the service; a power level of the UE; time resource expected to be utilized by the UE in accessing the service; a frequency resource expected to be utilized by the UE in accessing the service; and a power resource expected to be utilized by the UE in accessing the service.

19. The UE of claim 14, wherein the first RAT is fourth generation (4G) and the second RAT is fifth generation (5G) new radio (NR).

20. The UE of claim 14, wherein the barring factor satisfies the second barring factor threshold when the barring factor is less than the second barring factor threshold.

* * * * *